United States Patent
Zhang et al.

(10) Patent No.: US 11,260,614 B2
(45) Date of Patent: Mar. 1, 2022

(54) VENTING DEVICE AND TIRE MOLD

(71) Applicant: HIMILE MECHANICAL SCIENCE AND TECHNOLOGY (SHANDONG) CO., LTD., Shandong (CN)

(72) Inventors: Wei Zhang, Shandong (CN); Wanli Wang, Shandong (CN); Ping Du, Shandong (CN); Riwen Sun, Shandong (CN); Jian Li, Shandong (CN); Lixin Feng, Shandong (CN); Yizhao Zang, Shandong (CN)

(73) Assignee: HIMILE MECHANICAL SCIENCE AND TECHNOLOGY (SHANDONG) CO., LTD., Shandong (CN)

( * ) Notice: Subject to any disclaimer, the term of this patent is extended or adjusted under 35 U.S.C. 154(b) by 0 days.

(21) Appl. No.: 17/297,268

(22) PCT Filed: Oct. 11, 2019

(86) PCT No.: PCT/CN2019/110537
§ 371 (c)(1),
(2) Date: May 26, 2021

(87) PCT Pub. No.: WO2020/248445
PCT Pub. Date: Dec. 17, 2020

(65) Prior Publication Data
US 2021/0394474 A1    Dec. 23, 2021

(30) Foreign Application Priority Data
Jun. 12, 2019 (CN) .......................... 201910504263.9

(51) Int. Cl.
*B29D 30/06* (2006.01)
*B29C 33/10* (2006.01)

(52) U.S. Cl.
CPC .......... *B29D 30/0606* (2013.01); *B29C 33/10* (2013.01); *B29D 2030/0617* (2013.01)

(58) Field of Classification Search
CPC ........ B29D 30/0606; B29D 2030/0617; B29C 33/10
See application file for complete search history.

(56) References Cited

U.S. PATENT DOCUMENTS 9,873,234 B2 * 1/2018 Ohara ................ B29D 30/0606
10,006,554 B2 * 6/2018 Seo ..................... B29D 30/0606
(Continued)

FOREIGN PATENT DOCUMENTS

CN      201633153 U    11/2010
CN      204942180 U     1/2016
(Continued)

OTHER PUBLICATIONS

International Search Report dated Mar. 4, 2020 in International Appln No. PCT/CN2019/110537.

*Primary Examiner* — James P Mackey
(74) *Attorney, Agent, or Firm* — Medler Ferro Woodhouse & Mills PLLC

(57) ABSTRACT

A venting device and a tire mold are disclosed for use in a tire vulcanization process. The venting device includes a core shaft and a sleeve sleeved over the core shaft, a venting passage is formed between the sleeve and the core shaft, the core shaft includes a shaft body, one end of the shaft body is connected to a shaft head, the other end of the shaft body is connected to a shaft end piece provided with a groove extending through the shaft end piece, and an end of the groove facing away from the shaft head is closed. The shaft end piece is used for axially stopping the shaft body, and the shaft end piece is further used for assembling the sleeve and the core shaft by contracting and springing back.

19 Claims, 11 Drawing Sheets

(56) References Cited

U.S. PATENT DOCUMENTS

| | | | | |
|---|---|---|---|---|
| 11,090,842 B2 * | 8/2021 | Penkkimaki | .......... | F16K 15/063 |
| 2019/0283352 A1 * | 9/2019 | Hasseloef | ......... | B29D 30/0606 |

FOREIGN PATENT DOCUMENTS

| | | | | |
|---|---|---|---|---|
| CN | 207874648 U | | | 9/2018 |
| CN | 110027138 A | | | 7/2019 |
| DE | 195 43 276 | | * | 2/1997 |
| DE | 10 2011 053 207 | | * | 3/2013 |
| WO | 2007139523 A1 | | | 12/2007 |

* cited by examiner

VENTING DEVICE AND TIRE MOLD

CROSS-REFERENCE TO RELATED APPLICATION(S)

This application is a 371 national phase entry of PCT Appl. No. PCT/CN2019/110537, filed Oct. 11, 2019, which claims priority to CN Appl. No. 201910504263.9, the entire content of which is incorporated by reference herein.

FIELD OF THE DISCLOSURE

The present invention relates to a technical field of tire vulcanization, especially relates to a venting device and a tire mold.

BACKGROUND

At present, processes of manufacturing a tire are generally as follows: injecting rubber material in fluid or semi-fluid state into a tire mold, then forming a tire blank from the rubber material by means of a series of processes within the tire mold. After formation of the tire blank, the tire blank of the tire need to undergo a vulcanization process. During the vulcanization process, air within an inner cavity of the tire mold shall be expelled. At present, a generally used method is to provide venting holes on the tire mold, through which air within the tire mold is directly expelled.

However, there existed some problems in such a method, one of which lies in that during expelling air out of the tire mold, rubber material in fluid or semi-fluid state that is used for forming the tire, will also be partially extruded out through the venting holes; and in some molds for snow tire, the number of venting holes will be up to 5000 or more, and even be more than ten thousand. These extruded rubber material will form rubber burrs on the tire. In order to guarantee quality of a finished tire product, additional steps shall be provided to remove the rubber burrs formed on the tire, thus making the manufacturing process of the tire become complex.

In order to avoid rubber burrs formed on the tire product, a venting device for the tire mold has been developed, for example in the patent document with application No. CN200920283550.3, as referred to FIG. 18, the venting device includes a sleeve body 1', a shaft element 2' and a spring 3', the shaft element 2' is provided with slots 22' at a trailing end thereof so as to form two stops 21', the opening extent of the slots 22' varies to radially deform the two stops 21', thus mounting the shaft element 2' into the sleeve body 1' or detaching the same from the sleeve body 1'. The spring 3' and the shaft element 2' are received in an inner cavity of the sleeve body 1', and the spring 3' exerts a force on the shaft element 2' so that a gap is formed between a core cap 23' and the sleeve body 1', the air in the tire mold is expelled through the gap. After the air in the tire mold is expelled, the rubber material will press against the core cap 23', thus overcoming the force applied by the spring 3' to close the gap between the core cap 23' and the sleeve body 1', so that the expelling of the rubber material is prevented.

There existed some problems in the above mentioned structure of the venting device: first, the stops 21' may easily deformed, for example when the shaft element 2' is thermally treated, the shaft element 2' is installed and detached and so on, thus it will result in inaccurate closing stroke of the core cap 23', and the shaft element 2' may easily offset from the center, the rubber material will easily enter into the sleeve body 1', resulting in blocking the venting holes, thus in turn affecting tire vulcanization quality, and thus further deteriorating accuracy of the closing stroke of the core cap 23', besides, the closing stroke of the core cap 23' has a trend to increase by means of the elastic force of the spring 3'; second, the shaft element 2' is not sufficiently fixedly engaged, thus is easily to be disengaged; third, the stops 21' are not sufficiently robust, so when the shaft element 2' is installed and detached, root portions of the stops 21' may easily be formed with cracks or even be broken.

In summary, there is still a requirement in the field of tire mold to further improve the venting device thereof to solve the technical problems of the existing venting device in the prior art.

SUMMARY

An object of the present invention is to provide a venting device and a tire mold which may solve the above mentioned technical problems in the prior art.

In one aspect, a venting device provided by the present invention including a core shaft and a sleeve sleeved over the core shaft, a venting passage is formed between the sleeve and the core shaft, the sleeve has a gas inlet end and a gas outlet end; the core shaft includes a shaft body, one end of the shaft body is connected to a shaft head, the other end of the shaft body is connected to a shaft end piece provided with a groove extending through the shaft end piece, and an end of the groove facing away from the shaft head is closed; the shaft end piece is used for axially stopping the core shaft, and the shaft end piece is further used for assembling the sleeve and the core shaft by contracting and springing back.

Further, the shaft end piece comprises a first shaft section and a first guide, the first shaft section is connected between the shaft body and the first guide, the groove extends through the first shaft section and the first guide; the first guide has radial size decreased in a direction from the end connected to the first shaft section to the end away from the first shaft section.

Further, the outer wall surface of the first guide is a conical surface, the conical angle α of the first guide is in a range of 20 degree to 90 degree.

Further, when the core shaft is inserted into the sleeve from the gas inlet end, and the outer wall surface of the first guide abuts against the sleeve, an axial distance L1 from the end of the groove away from the shaft head to an abutting point is 10% to 60% of the axial length L of the groove.

Further, an end of the groove proximal to the shaft head extends in the shaft body, the shaft end piece is further for detaching the core shaft from the sleeve by means of contracting and springing back, and the groove communicates the venting passage and the outside of the venting device.

Further, the shaft end piece also includes a second guide connected between the shaft body and the first shaft section, the radial size of the second guide increases in a direction from the end connected to the shaft body to the end away from the shaft body.

Further, the outer wall surface of the second guide is a conical surface, the conical angle β of the second guide is in a range of 30 degree to 110 degree.

Further, when the venting device is in an assembled state, the second guide abut against the sleeve, an axial distance L2 from the end of the groove away from the shaft head to the abutting point is 25%~75% of an axial length L of the groove.

Further, the gas outlet end of the sleeve is provided with a guide surface for forming the gas outlet end of the sleeve with an opening having a radial size decreasing from outside to inside.

Further, the guide surface is a conical surface, the conical angle θ of the guide surface is in a range of 30 degree to 110 degree.

Further, when the venting device is in an assembled state, an end of the first shaft section towards the shaft head abuts against the guide surface, an axial distance L2 from the end of the groove away from the shaft head to the abutting point is 25%~75% of an axial length L of the groove. Further, a difference between a diameter of the first shaft section in a released state and an inner diameter of the gas outlet end of the sleeve is a, the value of the width W of the groove is in a range of 3a~10a.

Further, a difference between a diameter of the first shaft section in the released state and an inner diameter of the gas outlet end of the sleeve is in a range of 0.04 mm~0.1 mm.

Further, a ratio of an axial length L of the groove to a width W of the groove is in a range of 5~20.

Further, the end of the first guide away from the shaft head is connected by an extension.

Further, an outer wall surface of the shaft end piece includes an arc surface.

Further, an elastic element is provided between the sleeve and the shaft body; the core shaft has a first position and a second position in the axial direction; in the first position, a gas inlet gap is formed between the shaft head and the sleeve, the gas inlet gap communicates the venting passage and outside of the venting device, and the shaft end piece abuts against the sleeve; in the second position, the shaft head abuts against the sleeve; the elastic element is used for providing the core shaft with a trend of moving from the second position to the first position.

Further, the shaft end piece is further used for exerting a force on the core shaft from the shaft head to the shaft end piece, so that the shaft head abuts against the sleeve; a gas inlet slit or gas inlet opening is presented between the shaft head and the sleeve, the gas inlet slit or gas inlet opening communicates the venting passage and outside of the venting device.

In a second aspect, the present invention provides a tire mold including a venting device provided according to the first aspect, the mold is provided with a venting hole in which the venting device is disposed.

The embodiments of the present invention have the following beneficial effects: the venting device includes a core shaft and a sleeve sleeved over the core shaft, a venting passage is formed between the sleeve and the core shaft, the sleeve has a gas inlet end and a gas outlet end; the core shaft includes a shaft body, one end of the shaft body is connected to a shaft head, the other end of the shaft body is connected to a shaft end piece provided with a groove extending through the shaft end piece, and an end of the groove facing away from the shaft head is closed; the shaft end piece is used for axially stopping the core shaft, and the shaft end piece is further used for assembling the sleeve and the core shaft by contracting and springing back; by means of expelling air through the venting passage, and by means of preventing the rubber material from entering into the venting passage by the shaft head, the venting passage is protected from being blocked and the formation of rubber burr is prevented; the core shaft is inserted into the sleeve by means of contracting and springing back the shaft end piece, thus assembly of the core shaft can be facilitated, the closing stroke of the shaft head has a high accuracy, the core shaft is robust, the core shaft will not easily offset from the center, and the shaft end piece will not be easily broken.

In order that the above object, characteristics and advantageous of the present invention can be more easily understood, preferred embodiments, by reference to the attached drawings, will be explained in detail hereinafter.

BRIEF DESCRIPTION OF DRAWINGS

In order to clearly explain the specific embodiments of the present invention and technical solutions of the related technique, the drawings needed for illustrating the specific embodiments or related technique will be introduced briefly, and obviously, the drawings illustrated below are some embodiments of the present invention, and other drawings can be obtained by one skilled in the art based on these drawings without creative efforts.

Figure 1:
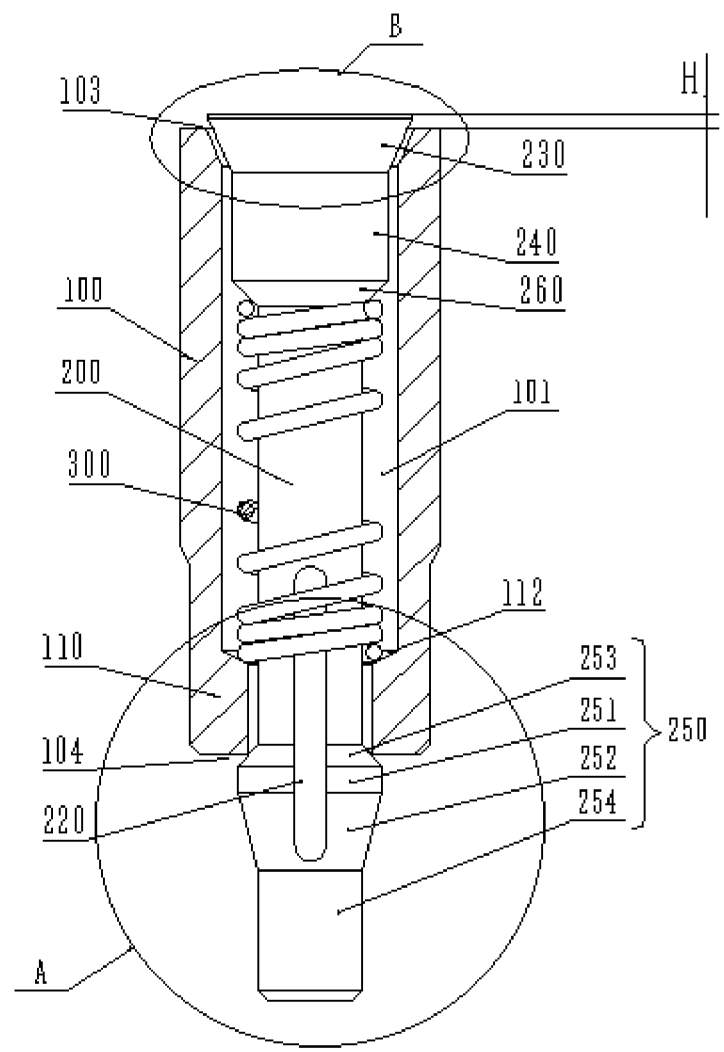
FIG. 1 is a structural schematic view of a venting device with a core shaft in a first position provided according to embodiment I of the present invention.

Reference numbers: 1' sleeve body; 2' shaft element; 21' stop; 22' slot; 23' core cap; 3' spring; 100 sleeve; 101 venting passage; 102 gas inlet gap; 103 gas inlet end; 104 gas outlet end; 110 stopping collar; 111 guide surface; 112 inner cavity step; 200 core shaft; 210 shaft body; 220 groove; 230 shaft head; 231 annular slot; 232 gas slot; 240 second shaft section; 250 shaft end piece; 251 first shaft section; 252 first guide; 253 second guide; 254 extension; 260 shaft shoulder; 300 elastic element; 400 cavity molding part; 410 venting hole; 500 tire blank.

DETAILED DESCRIPTION OF THE INVENTION

Hereinafter, the technical solutions of the present invention will be clearly and completely described with reference to the drawings, obviously the described embodiments are just part of the embodiments of the present invention, instead of all the embodiments thereof. Based on the embodiments of the present invention, any other embodiments obtained by one skilled in the art without creative efforts do not go beyond the protective scope of the present invention.

In the description of the present invention, it shall be understood that the terms referring to orientations or positional relations, such as "center", "upper", "lower", "left", "right", "inside", "outside" and the like are based on the orientations or positions shown in the drawings, which are just for ease of describing the present invention and simplifying the description, but not to indicate or imply that the device or the element referred to shall take the specific orientations or shall be configured and operated in the specific orientations, so they shall not be understood as limitations on the present invention. Besides, the terms of "first", "second" are only used for purpose of illustration, and shall not be understood as indicating or implying importance of the features therebetween.

In the illustration of the present invention, it shall be understood that unless another specific prescription and definition, such terms as "install" "interconnect", "connect" and the like shall be understood in a broad way, for example it can be fixedly connected, and can also be detachably connected, or integrated as one piece; it can be mechanically connected, and can also be electrically connected; it can be directly connected, and can also be indirectly connected via an intermediate; it can be internal communication between two elements. For one skilled in the art, the specific meaning of the above mentioned terms can be understood according to the detailed circumstance.

Embodiment I

As shown in FIGS. 1, 2, 3 and 6, a venting device provided by the embodiment of the present invention includes a core shaft 200 and a sleeve 100 sleeved over the core shaft 200, a venting passage 101 is formed between the sleeve 100 and the core shaft 200, the sleeve 100 has a gas inlet end 103 and a gas outlet end 104; the core shaft 200 includes a shaft body 210, one end of the shaft body 210 is connected to a shaft head 230, the other end of the shaft body 210 is connected to a shaft end piece 250 provided with a groove 220 extending through the shaft end piece 250, and an end of the groove 220 facing away from the shaft head 230 is closed; the shaft end piece 250 is used for axially stopping the core shaft 200, and the shaft end piece 250 is further used for assembling the sleeve 100 and the core shaft 200 by contracting and springing back. Wherein, the shaft body 210, the shaft head 230 and the shaft end piece 250 are integrally formed, so that the number of the components can be reduced, thus lowering failure rate of the venting device. The groove 220 extends axially along the axial end piece 250, an end of the groove facing away from the shaft head 230 is closed, i.e. the groove 220 does not extends through to the end of the shaft end piece 250 facing away from the shaft body 210. The end of the groove 220 facing away from the shaft head 230 is closed, so that plastic deformation of the shaft end piece 250 caused from stress releasing and the like during the steps of mechanical process, thermal treatment and the like, thus guaranteeing stable and highly accurate closing stroke H of the core shaft 200. Also, when the shaft end piece 250 is contracted by means of a radial pressure, both ends of the groove 220 in an axial direction of the shaft end piece 250 have support function, so that fatigue failure or plastic deformation of the shaft end piece 250 after undergoing plurality of times of radial pressure can be avoided, and it in turn can guarantee that the shaft end piece 250 can spring back by means of spring force and abut against the gas outlet end 104 of the sleeve 100, the shaft end piece 250 possesses sound rigidity, thus can stably stop the core shaft 200, the core shaft 200 has a stable and highly accurate closing stroke H, the core shaft 200 will not easily offset, and the shaft end piece 250 will not be broken when the part of the groove 220 is pressed. When the shaft end piece 250 contracts, the opening degree of the groove 220 supported by elastic force has a trend to increase, and thus can limit the axial movement stroke of the shaft body 210 within the shaft end piece 250 after the installation of the core shaft 200 is finished. Specifically, a cross section of the shaft head 230 is disposed as circular or polygon, the gas inlet end 103 of the sleeve 100 is provided with an opening accommodating the shaft head 230, a gas inlet gap 102 can be formed between the shaft head 230 and the sleeve 100 for communicating the venting passage 101. When the tire undergoes vulcanization, gas within the inner cavity of the mold can flow into the venting passage 101 via the gas inlet gap 102 between the shaft head 230 and the sleeve 100, and then be further expelled outside the mold, when the shaft head 230 abuts against the sleeve 100, the gas inlet gap 102 is closed, preventing the rubber material from entering into the venting passage 101. One end of the shaft head 230 is connected to the shaft body 210, and diametric size of the shaft head 230 increases from the end connected to the shaft body 210 to the end thereof facing away from the shaft body 210, and an outer wall surface of the shaft head 230 is preferably a conical surface, the gas inlet end 103 of the sleeve 100 is provided with a conical hole mating with the shaft head 230.

An elastic element 300 is provided between the sleeve 100 and the shaft body 210, the core shaft 200 has a first position and a second position in the axial direction; the elastic element 300 exerts a biasing force on the core shaft 200, for providing the core shaft 200 with a trend of moving from the second position to the first position, the axial distance of the core shaft 200 from the second position to the first position is the closing stroke H of the core shaft 200; in the first position, the shaft head 230 is separated from the sleeve 100, and the gas inlet gap 102 is formed between the shaft head 230 and the sleeve 100, the gas inlet gap 102 communicates the venting passage 101 with outside of the venting device, and the shaft end piece 250 abuts against the gas outlet end 104 of the sleeve 100, preventing further movement of the core shaft 200 by means of the biasing force; in the second position, the shaft head 230 abuts against the gas inlet end 103 of the sleeve 100, thus closing one end of the venting passage 101.

Further, the elastic element 300 may be a spring, the spring is disposed on the core shaft 200 and produce a biasing force on the core shaft 200 in such a way that an inner cavity of the sleeve 100 is formed with an inner cavity step 112, the spring may be sleeved over the shaft body 210, one end of the spring abuts against the inner cavity step 112, and the other end of the spring abuts against the shaft head 230 or abuts against a shaft shoulder 260 formed at an appropriate position of the core shaft 200. A second shaft section 240 is connected between the shaft head 230 and the shaft body 210, the second shaft section 240 has a diameter larger than the shaft body 210, the shaft shoulder 260 is formed on the core shaft 200, the second shaft section 240 facilitates in improving stability of the core shaft 200 and coaxiality of core shaft with the sleeve 100. The gas outlet end 104 of the sleeve 100 is provided with a stopping collar 110 so that the inner cavity of the sleeve 100 is in the shape of step, the inner cavity step 112 is formed in the inner cavity of the sleeve 100.

In the present embodiment, the inner diameter of the gas outlet end 104 of the sleeve 100 is just the inner diameter of the stopping collar 110, the inner diameter of the stopping collar is larger than the diameter of the shaft body 210 and is less than the diameter of the shaft end piece 250 in the released state, the stopping collar 110 mates with the shaft end piece 250 to axially stop the core shaft 200. The shaft end piece 250 is disposed so as to elastically deform under exterior force, so that its radial size reduces, when the shaft end piece 250 is in a contracted state, the radial size of the shaft end piece 250 decreases, so that the core shaft 200 can extends through the inner cavity of the sleeve 100, and the deformation amount of the shaft end piece 250 disappears after extending through the inner cavity of the sleeve 100 and is in a released state (also called a natural state), and the core shaft 200 is axially stopped by the shaft end piece 250 in the released state, thus completing assembly of the core shaft 200.

Figure 4:
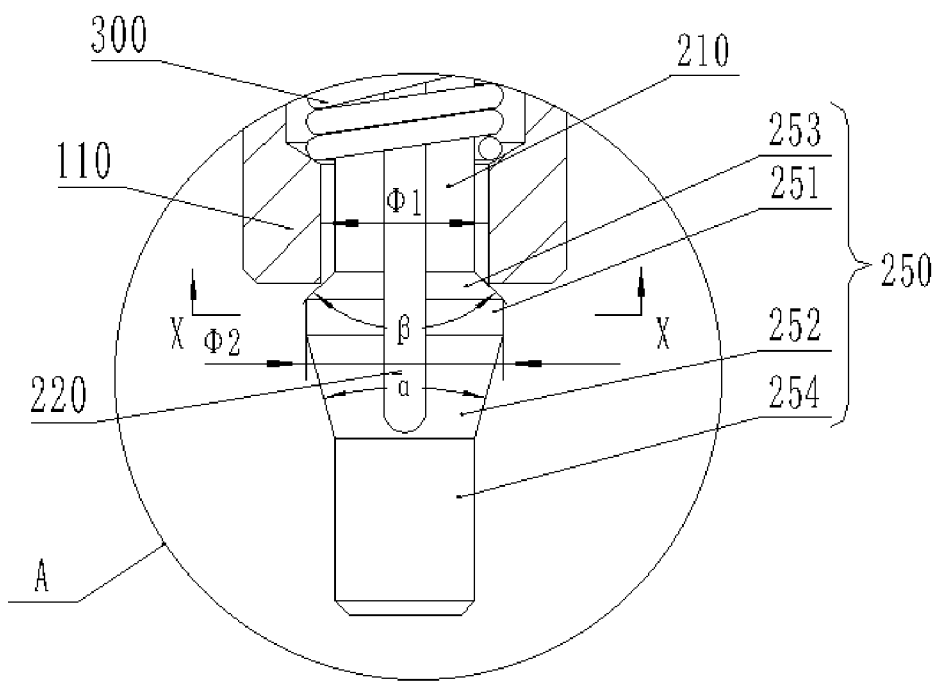
FIG. 4 is an enlarged schematic view I of position A in FIG. 1.

As shown in FIGS. 1 and 4, in an assembled state of the venting device, the shaft end piece 250 extends beyond the stopping collar 110 and abuts against one side of the stopping collar 110. The shaft end piece 250 comprises a first shaft section 251 and a first guide 252, the first shaft section 251 is connected between the shaft body 210 and the first guide 252, the groove 220 extends through the first shaft section 251 and the first guide 252; the first guide 252 has radial size decreased in a direction from the end connected to the first shaft section 251 to an end facing away from the first shaft section 251. When the core shaft 200 is inserted into the sleeve 100, the outer wall surface of the first guide 252 functions to guide, during insertion of the core shaft 200 into the sleeve 100, the first guide 252 may abuts against the stopping collar 110, and the sleeve exerts radial press on the shaft end piece 250, thus the shaft end piece 250 elastically deforms, a radial size of the axial end piece 250 decreases, allowing the shaft end piece 250 to extend through the inner cavity of the sleeve 100, thus realizing easy installation of the shaft body 210.

Preferably, the outer wall surface of the first guide 252 can be conical surface, ramp, arc surface and the like, preferably a conical surface; the conical angle α of the first guide 252 is in a range of 20 degree to 90 degree, more preferably 20 degree to 45 degree; wherein an angle between a generatrix line of the first guide 252 and an axis of the core shaft 200 can be disposed as 10 degree, 15 degree or 20 degree, during insertion of the shaft body 210 into the inner cavity of the sleeve 100, a side wall of the first guide 252 abuts against the stopping collar 110 and slips with respect thereto, thus functioning to guide; when the first guide 252 is subjected to a radial pressure, the opening degree of the grove 220 decreases, the shaft end piece 250 contracts in a pressed direction, and in turn facilitates in inserting the core shaft 200 into the sleeve 100, thus with a low resistance when the core shaft 200 is installed.

Figure 5:
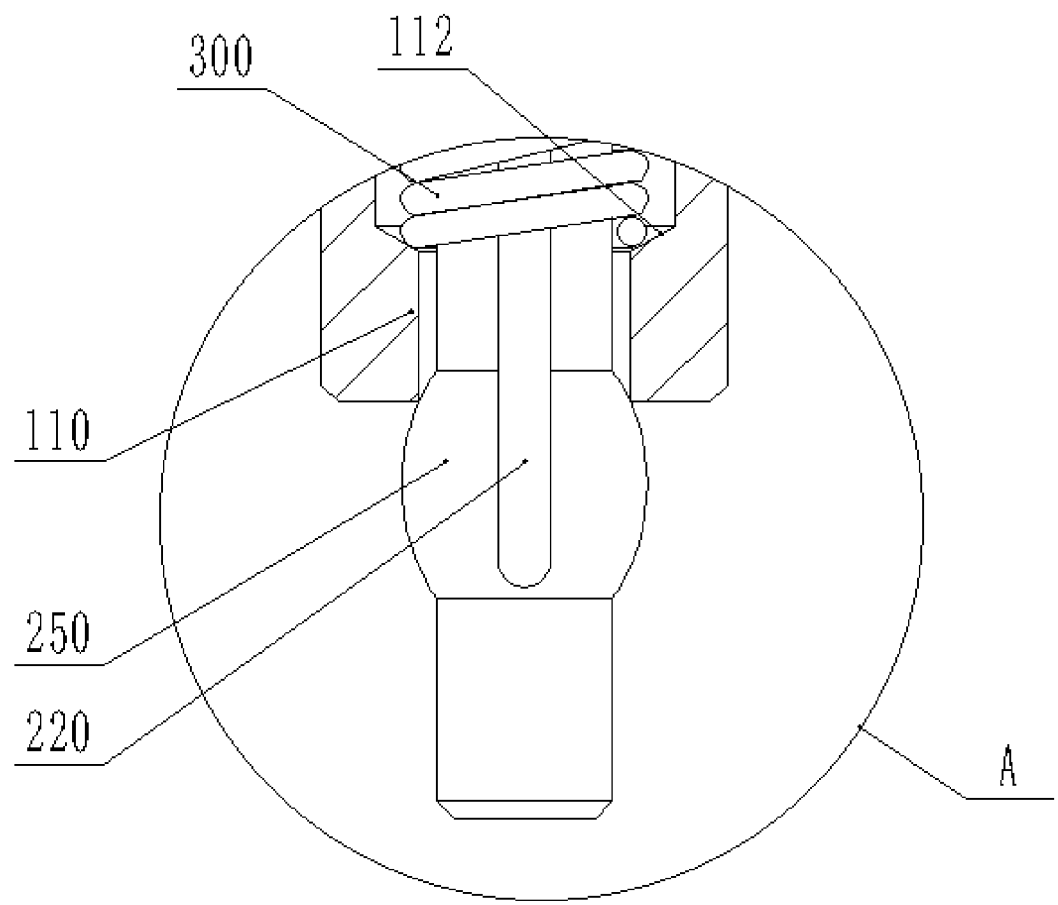
FIG. 5 is an enlarged schematic view II of position A in FIG. 1.
Figure 6:
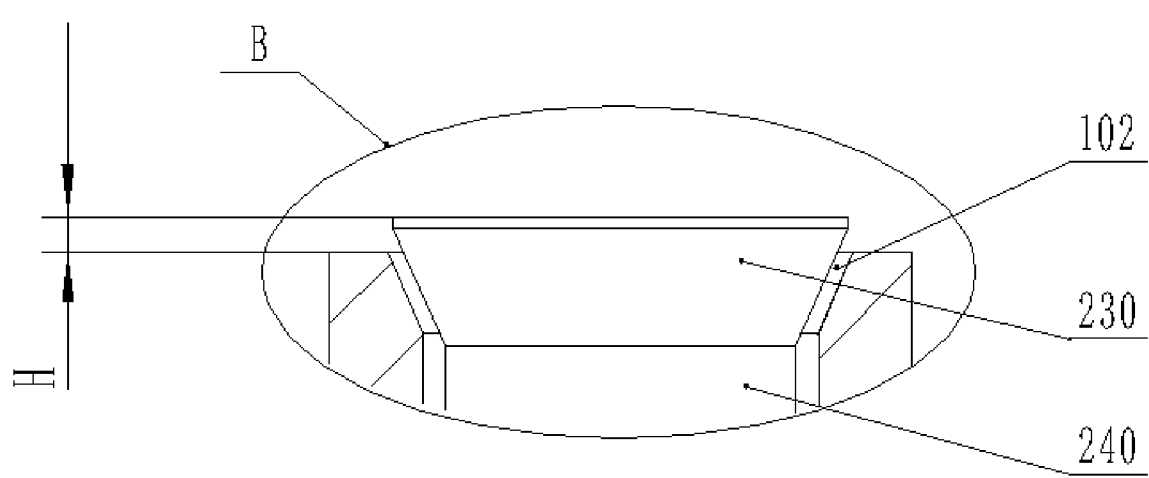
FIG. 6 is an enlarged schematic view of position B in FIG. 1.

As shown in FIG. 5, in other embodiments, the shaft end piece 250 can also include an approximately spherical or ellipsoidal body, the outer wall surface of the shaft end piece 250 includes an arc surface, the groove 220 extends through the shaft end piece 250, so that the shaft end piece 250 can contract and spring back.

Figure 7:
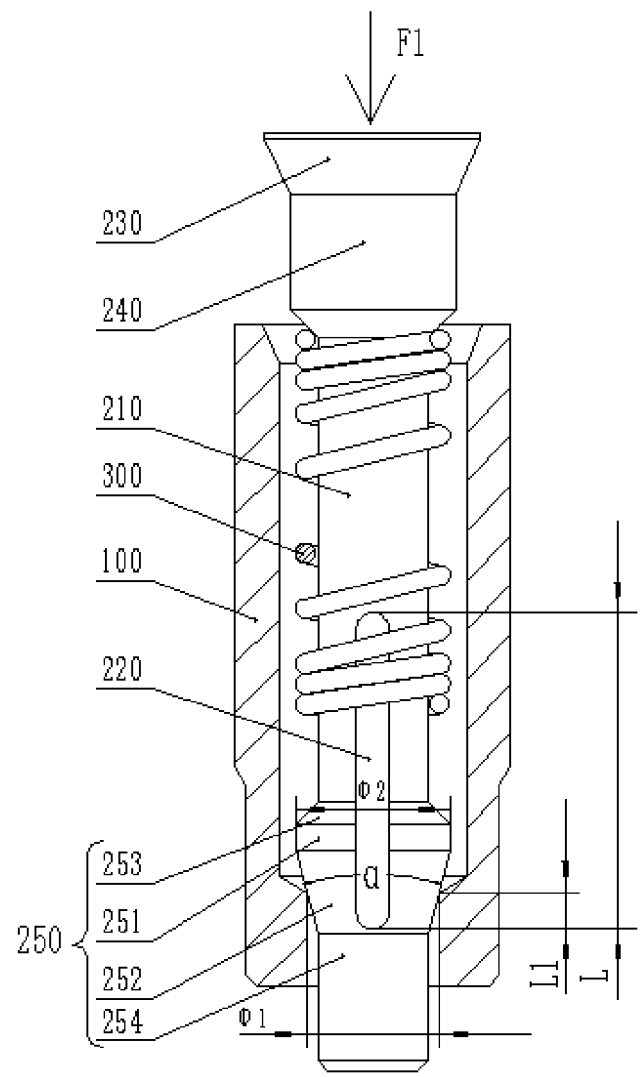
FIG. 7 is a schematic view of assembling the venting device provided according to embodiment I of the present invention.

As shown in FIG. 7, when the core shaft 220 is inserted into the sleeve 100, and the outer wall surface of the first guide 252 abuts against the stopping collar 110 of the sleeve 100, an axial distance L1 from an end of the groove 220 away from the shaft head 230 to an abutting point is 10% to 60% of the axial length L of the groove 220. Specifically, the axial distance L1 from the end of the groove 220 away from the shaft head 230 to the abutting point can be 20%, 35%, 40% or 45% of the axial length L of the groove 220, thus can reduce internal stress produced by radial contract of the shaft end piece 250.

Figure 8:
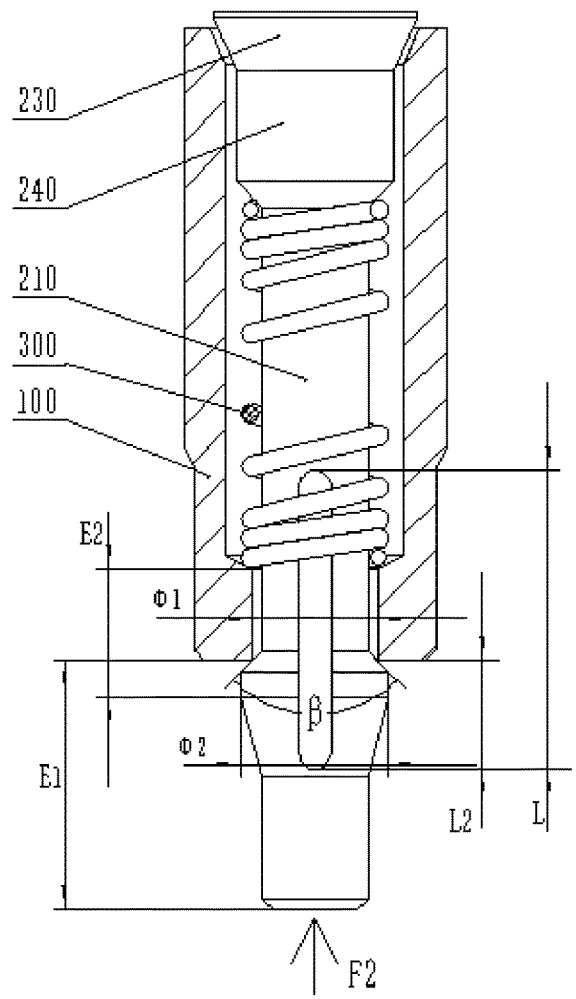
FIG. 8 is a schematic view of detaching the core shaft of the venting device provided according to embodiment I of the present invention.

Further, the shaft end piece 250 also includes an extension 254 connected to the first guide 252, when the shaft end piece 250 is radially pressed to contract, the extension 254 has support function, thus enhancing strength and rigidity of the shaft end piece 250, guaranteeing robust of the core shaft 200, the core shaft 200 has a stable and highly accurate closing stroke H, and the shaft end piece 250 can be protected from elastic fatigue or being broken after subjecting to radial pressure several times. At the same time, the provision of the extension 254 also facilitates in ejecting the core shaft 200 by an ejector. As shown in FIGS. 1 and 8, when the venting device is in the assembled state, a distance E1 from a tailing end of the extension 254 to the gas outlet end 104 of the sleeve 100 is larger than the distance E2 from an end of the first shaft section 251 facing away from the shaft head 230 to an inner side of the stopping collar 110, so that the core shaft 200 can be detached easily. The extension 254 can be a cylinder. In some embodiments, the axial length of the first guide 252 can also be properly extended, so that when the shaft end piece 250 contracts upon radial press, one end of the first guide 252 functions to support. Preferably, an axial length of the end of the shaft end piece 250 away from the shaft head 230 to the end of the groove 220 away from the shaft head 230 is twice or more of the width of the groove 220, thus it can function better to support.

Figure 2:
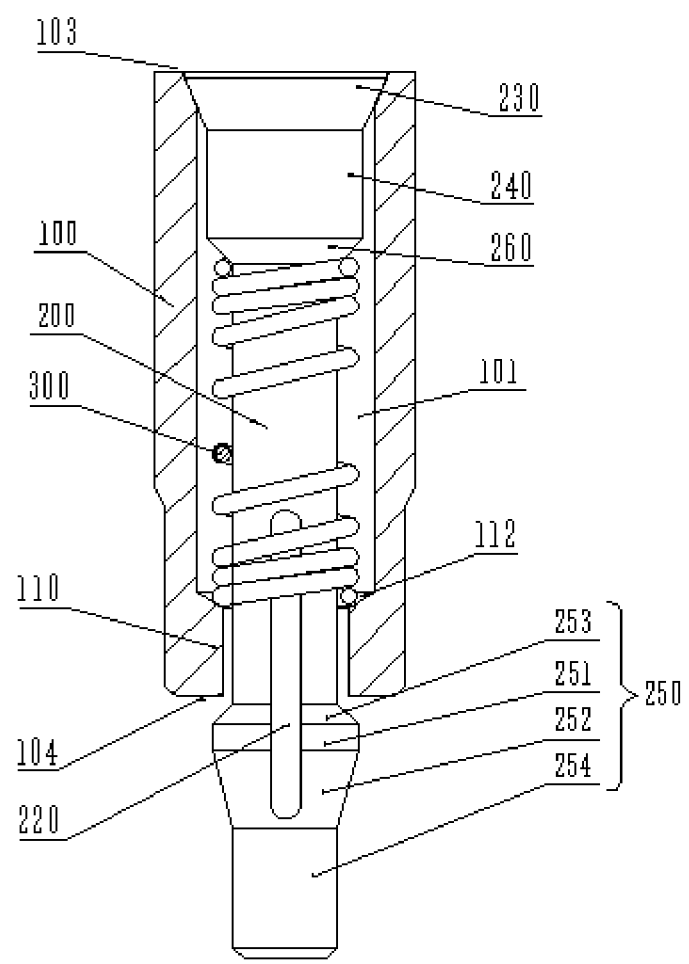
FIG. 2 is a structural schematic view of a venting device with a core shaft in a second position provided according to embodiment I of the present invention.
Figure 3:
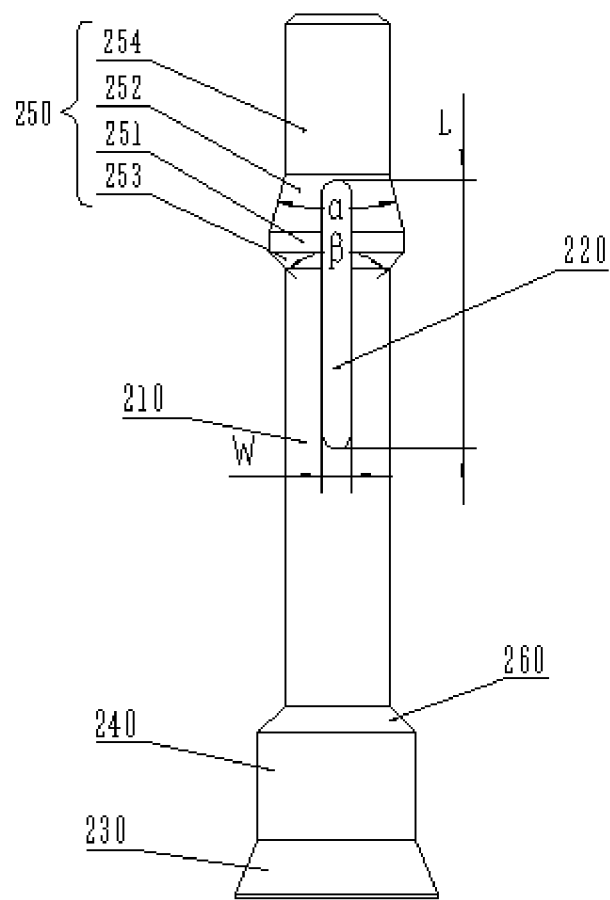
FIG. 3 is a structural schematic view of the core of the venting device provided according to embodiment I of the present invention.

As shown in FIGS. 1, 2, and 3, the opening shape of the groove 220 can be rectangular shape, and also can be elongated shape with both ends thereof rounded, preferably it is of elongated shape with both ends thereof rounded, thus avoiding stress concentration when the shaft end piece 250 is contracted, the method for processing the groove 220 can be mechanical process or laser process. In some embodiments, the end of the groove 220 facing away from the shaft head 230 can extend in the extension 254 so that the extending length of the groove 220 can be increased, thus lowering bending stress that the side walls of the groove 220 is subjected when the shaft end piece 250 is radially compressed.

Preferably, a ratio of the length L of the groove 220 in the axial direction of the core shaft 200 to the width W of the groove 220 is preferably in the range of 5 or larger, preferably in the range of 5~20. Wherein, a ratio of the length L of the groove 220 to the width W of the groove 220 can be set as 6, 8, 10, 12, 14, 16 or 18, by increasing ration of length to width of the groove 220, bending stress resulted from contraction of the width size of the groove 220 can be lowered, thus in turn preventing the core shaft 200 from being broken caused by contraction of the groove 220.

Preferably, the depth direction of the groove 220 is the radial direction of the core shaft 200, and the length direction of the groove 220 is the axial direction of the core shaft 200, so that the groove 220 can be easily processed, the shaft end piece 250 deforms uniformly when being radially pressed, thus will not easily be damaged.

Further, an end of the groove 220 proximal to the shaft head 230 may extend in the shaft body 210, the shaft end piece 250 is further for detaching the core shaft 200 from the sleeve 100 by means of contracting and springing back, and the groove 220 communicates the venting passage 101 and the outside of the venting device. When venting, the gas in the venting passage 101 can be expelled through the groove 220. During maintenance of an apparatus, such as a tire mold, the core shaft 200 can be detached from the inner cavity of the sleeve 100, so that the core shaft 200 and the inner wall of the sleeve 100 can be cleaned, after being cleaned, the core shaft 200 can be installed back into the sleeve 100, without the need of totally disassembling the venting device, thus avoiding the problems of damaging the venting holes of the tire mold, increasing of the hole diameter, and the sleeve 100 being damaged, which may result in the need of re-disposing the venting device, thus the venting device can be reused, and the worn core shaft 200 can be replaced. Besides, it is beneficial in reducing damage to the mold, thus extending life time of the mold.

It shall be contemplated that in some embodiments, gas outlet hole(s) can also be provided on the sleeve 100 for venting gas, for example the gas outlet hole(s) can be provided on and through the outer wall of the sleeve 100.

Then keep on referring to FIGS. 1-4, a second guide 253 may be connected between the first shaft section 251 and the shaft body 210, the second guide 253 decreases in radial size from an end connected to the first shaft section 251 to an end connected to the shaft body 210. When the shaft body is installed to the inner cavity of the sleeve 100, the second guide 253 abuts against the stopping collar 110 at the gas outlet end 104 of the sleeve 100, so that the shaft body 210, the shaft end piece 250 and the sleeve 100 are coaxial, and the core shaft 200 will not easily offset from center. When detaching the core shaft 200, the second guide 253 slips with respect to the stopping collar 110 at the gas outlet end 104 of the sleeve 100, thus functions to guide, and the resistance force for detachment is relatively low.

Preferably, an outer wall surface of the second guide 253 can be conical surface, ramp, arc surface and the like, preferably the conical surface, the conical angle β of the second guide 253 is in a range of 30 degree to 110 degree, preferably 80 degree to 100 degree, for example 80 degree, 90 degree or 100 degree, so that the shaft end piece 250 can stop the core shaft 200 better, the core shaft 200 will be robust and highly stable, and the core shaft 200 can be relatively easily detached.

The inner diameter $\Phi 1$ of the stopping collar 110 is greater than the diameter of the shaft body 210, and the inner diameter $\Phi 1$ of the stopping collar 110 is less than the diameter $\Phi 2$ of the first shaft section 251 in the released state. Wherein, the stopping collar 110 is integral with the sleeve 100, and the stopping collar 110 extends to a direction proximal to the axis of the sleeve 100. When the core shaft 200 is inserted into the sleeve 100, an outer surface of the first guide 252 of the shaft end piece 250 abuts against the side of the stopping collar 110 close to the shaft head 230, after the shaft body 210 is inserted into the sleeve 100, the second guide 253 of the shaft end piece 250 abuts against the side of the stopping collar 110 facing away from the shaft head 230; during venting, the gas within the venting passage 101 can flow through a slit between the shaft body 210 and the stopping collar 110, then being expelled via the groove 220.

As shown in FIG. 4, a difference between a diameter $\Phi 2$ of the first shaft section 251 and the inner diameter $\Phi 1$ of the stopping collar 110 is a, the width W of the groove 220 is in a range of 3a or greater, preferably in the range of 3a-10a. When the diameter of the shaft end piece 250 is reduced by a under radial pressure, thus allowing the shaft end piece 250 to extend through the stopping collar 110, thus in turn realizing disassembling of the core shaft 200. Radial contraction of the shaft end piece 250 is realized by reducing the width of the groove 220, the width W of the groove 220 is preferably in a range of 3a-10a, for example the width W of the groove 220 can be disposed as $4a$, $5a$, $6a$, $7a$, $8a$ or $9a$, thus the width of the groove 220 may possess sufficient margin for contraction.

Furthermore, a difference a between the diameter $\Phi 2$ of the first shaft section 251 in the released state and the inner diameter $\Phi 1$ of the stopping collar 110 is in a range of 0.04 mm to 0.1 mm, preferably 0.06 mm to 0.08 mm. For example, the difference between the diameter $\Phi 2$ of the shaft end piece 250 under the released state and the inner diameter $\Phi 1$ of the stopping collar 110 can be disposed as 0.06 mm, 0.07 mm or 0.08 mm. The shaft end piece 250 in the released state can prevent the core shaft 200 from disengaging from the sleeve 100, the core shaft 200 has good robust, the closing stroke H of the core shaft 200 is stable, and the shaft end piece 250 in radially contracted state may extend through the stopping collar 110 to realize installation and detachment of the shaft body 210, thus the core shaft 200 can be installed and detached relatively easily. Wherein, a height of the first shaft section 251 is preferably less than 2 mm, thus when the core shaft 200 is installed and detached, a contact area between the first shaft section 251 and the inner wall of the stopping collar 110 may be less, the contact time period may be shorter, and thus the core shaft 200 can be more easily installed and detached.

Please refer to FIGS. 1 and 8, when the venting device is in the assembled state, the second guide 253 abuts against the stopping collar 110 of the sleeve 100, an axial distance from an end of the groove 220 facing away from the shaft head 230 to the abutting point is 25% to 75% of an axial length L of the groove 220, preferably 30% to 45%, 55% to 70%, the abutting point is located at a side of the axial middle point of the groove 220, the shaft end piece 250 may have a more steady stopping function for the core shaft 200, the core shaft 200 have a better robust and stability, the closing stroke H of the core shaft 200 is steady, and the core shaft 200 will not be easily disengaged, while the core shaft 200 can be easily disengaged from the sleeve 100 by action of an exterior force. For example, when the venting device is in the assembled state, the second guide 253 abuts against the stopping collar 110 of the sleeve 100, a ratio of an axial distance L2 from an end of the groove 220 facing away from the shaft head 230 to the abutting point to an axial length L can be disposed as 30%, 35%, 40%, 55%, 60% or 65%.

Figure 9:
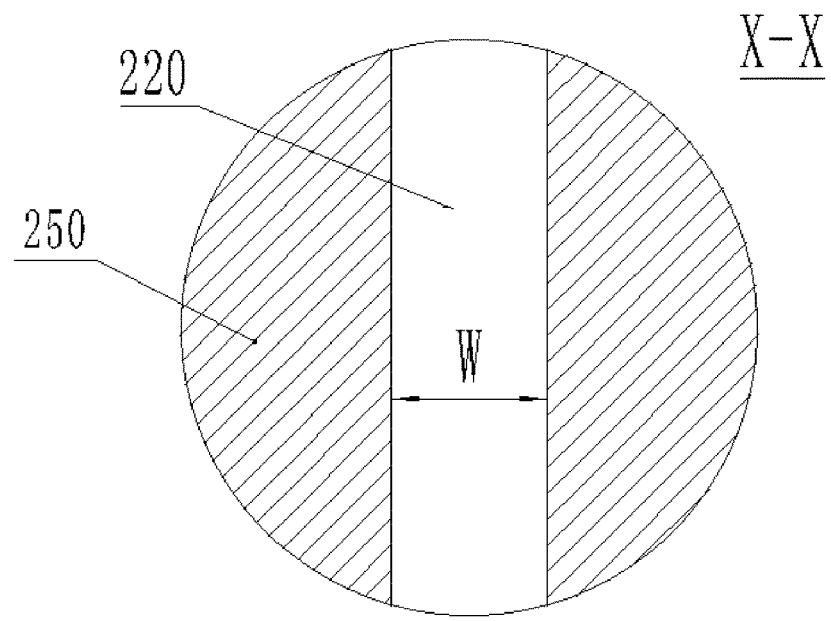
FIG. 9 is a cross-sectional view I taken along X-X in FIG. 4.
Figure 10:
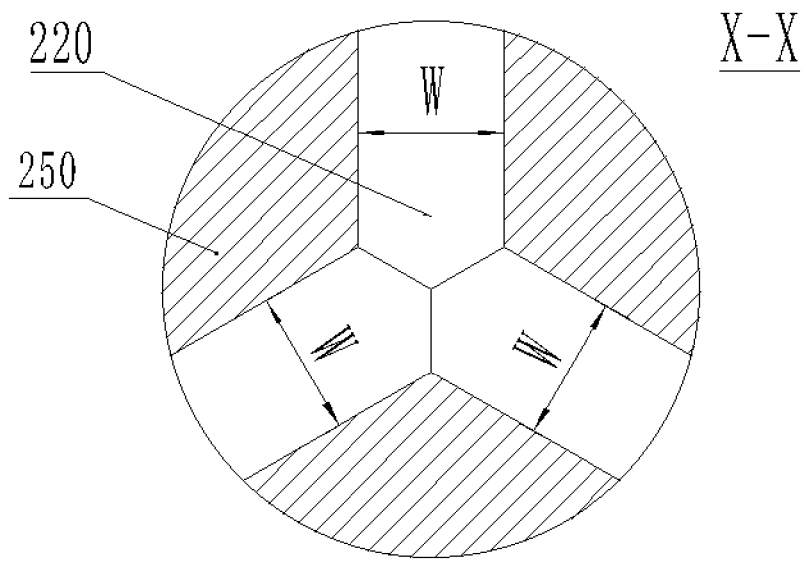
FIG. 10 is a cross-sectional view II taken along X-X in FIG. 4.
Figure 11:
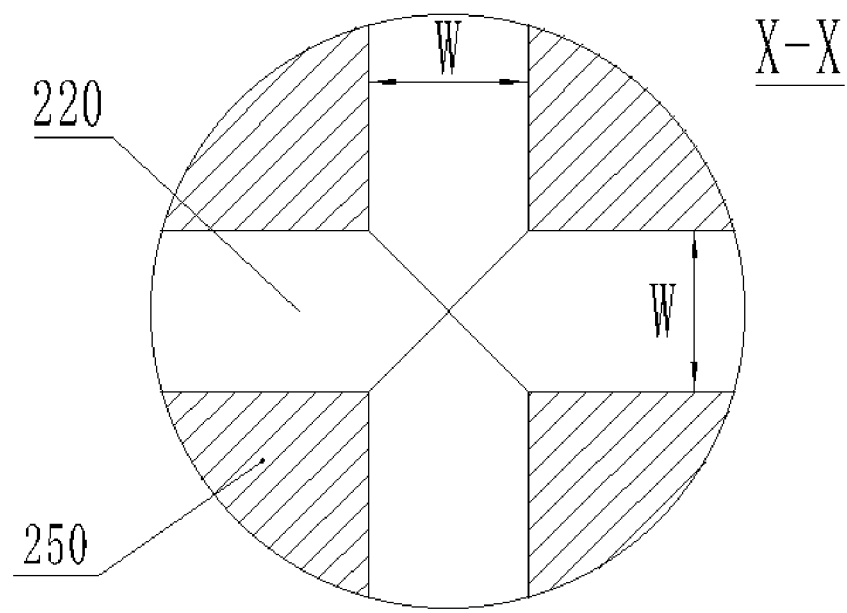
FIG. 11 is a cross-sectional view III taken along X-X in FIG. 4.

It shall be illustrated that "the groove 220 extending through the shaft end piece 250" does not merely mean that the groove 220 extends through the shaft end piece 250 along a single straight line, but broadly means that the groove 220 has a plurality of openings, for example 2, 3, 4 openings, which are circumferentially arranged along the shaft end piece 250. Wherein the groove 220 extends through in the radial direction of the shaft end piece 250, so that when the shaft end piece 250 is subjected to a radial pressure, the width of the groove 220 reduces, the radial size of the shaft end piece 250 contracts, with the deformation amount of the shaft end piece 250 at both ends of the groove 220 being uniform. As shown in FIGS. 9-11, the groove 220 may extend through the shaft end piece 250 in a radial direction of the core shaft 200. The groove 220 may further includes a plurality of sub-grooves, for example 3 or 4 sub-grooves, the depth of the plurality of sub-grooves is the radii of the core shaft 200, and communicate with each other within the core shaft 200.

As shown in FIG. 7, the process for assembling the venting device includes: first, a spring is sleeved on the shaft body 210; then the core shaft 200 from an end of the sleeve 100 is inserted into the inner cavity of the sleeve 100; a thrust F1 is exerted to the shaft head 230 along the axial direction of the sleeve 100, the first guide 252 abuts against the inner side of the stopping collar 110, the shaft end piece 250 contract by axial compression, further, the shaft end piece 250 extends beyond the stopping collar 110, the deformation of the shaft end piece 250 disappears, thus abuts against outer side of the stopping collar 110 under action of the spring.

As shown in FIG. 8, the process of disassembling the core shaft 200 of the venting device includes: a thrust F2 is applied to the core shaft 200 at a tailing end of the core shaft 200, or a pulling force is applied to the core shaft 200 from the shaft head 230 of the core shaft 200, the shaft end piece 250 is radially pressed to contract, the shaft end piece 250 further extends beyond the stopping collar 110, then the deformation of the shaft end piece 250 disappears, the core shaft 200 disengages from the sleeve 100.

Embodiment II

Figure 12:
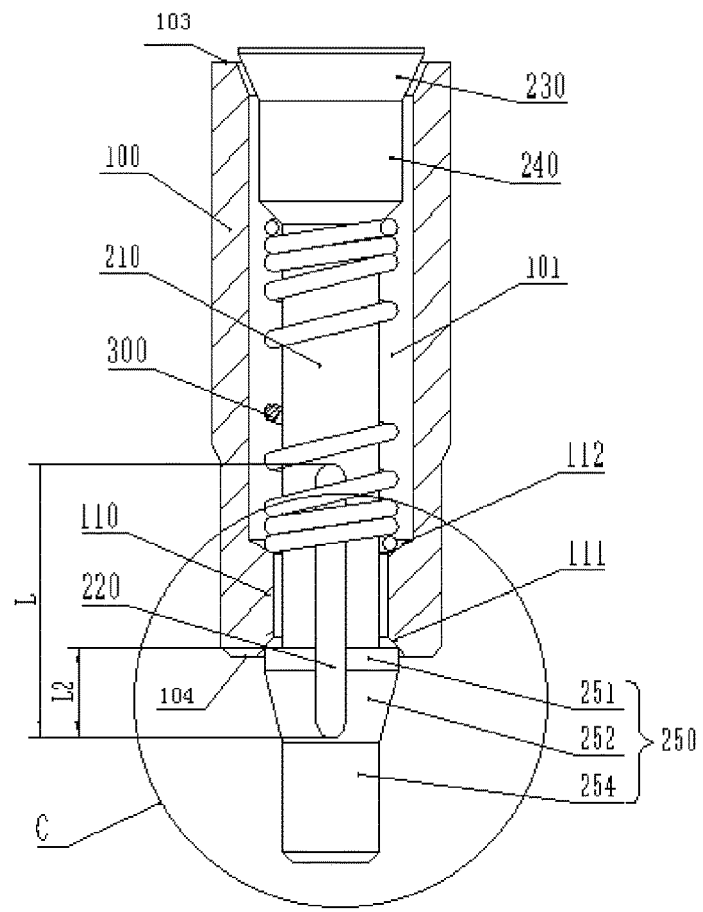
FIG. 12 is a structural schematic view of the venting device provided according to embodiment II of the present invention.
Figure 13:
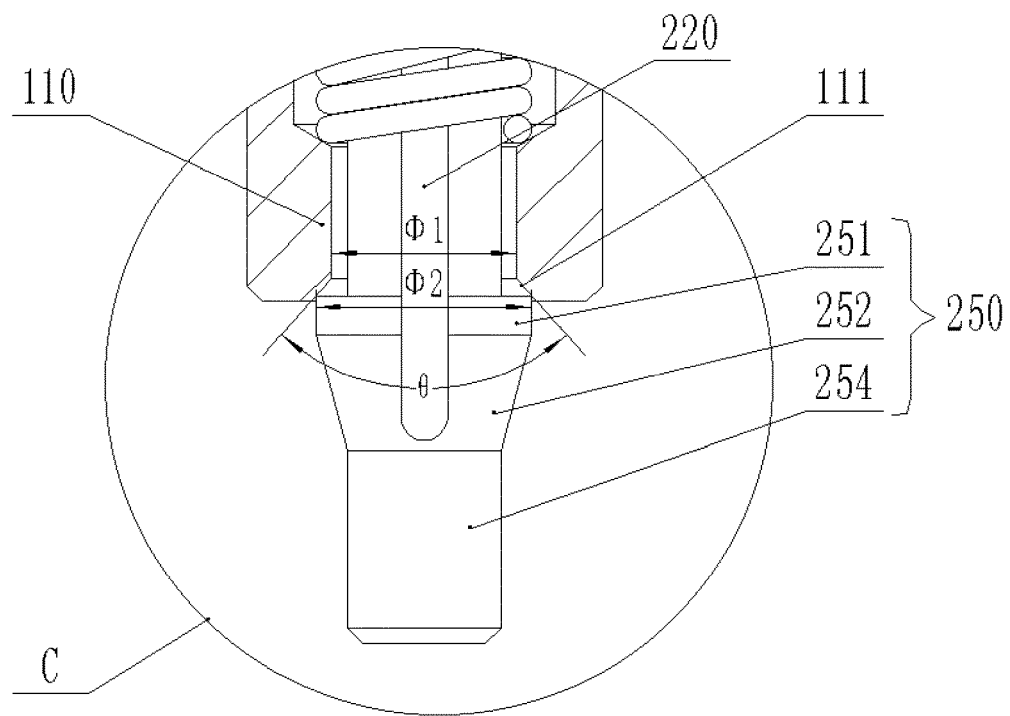
FIG. 13 is an enlarged schematic view of position C in FIG. 12.

As shown in FIGS. 12, 13, this embodiment differs from embodiment I in that the stopping collar 110 is provided at its outer side, along axial direction of the sleeve 100, with a guide surface 111; the guide surface 111 is used for forming the gas outlet end 104 of the sleeve 100 with an opening with its radial size decreases from outside to inside.

A step is formed between the first shaft section 251 and the shaft body 210, when the venting device is mounted, an end of the first shaft section 251 proximal to the shaft head 230 abuts with its edge against the guide surface 111. In the process of detaching the core shaft 200 from the inner cavity of the sleeve 100, the shaft end piece 250 slides along the second guide surface 111, so that the second guide surface 111 functions to guide the shaft end piece 250. Further, the guide surface 111 may be conical surface, ramp, arc surface and the like, and preferably be a conical surface, a conical angle θ of the guide surface 111 is in a range of 30 degree to 110 degree, so that the shaft end piece 250 can function to stop the core shaft 200 better, the core shaft 200 is more robust and more steady, and the core shaft can be more easily detached.

It shall be illustrated that the first shaft section 251 and the shaft body 210 may also connect to each other by a conical surface, when the venting device is assembled, an outer edge at an end of the first shaft section 251 proximal to the shaft head 230 abuts against the guide surface 111, or the conical surface abuts against the guide surface 111.

Embodiment III

Figure 14:
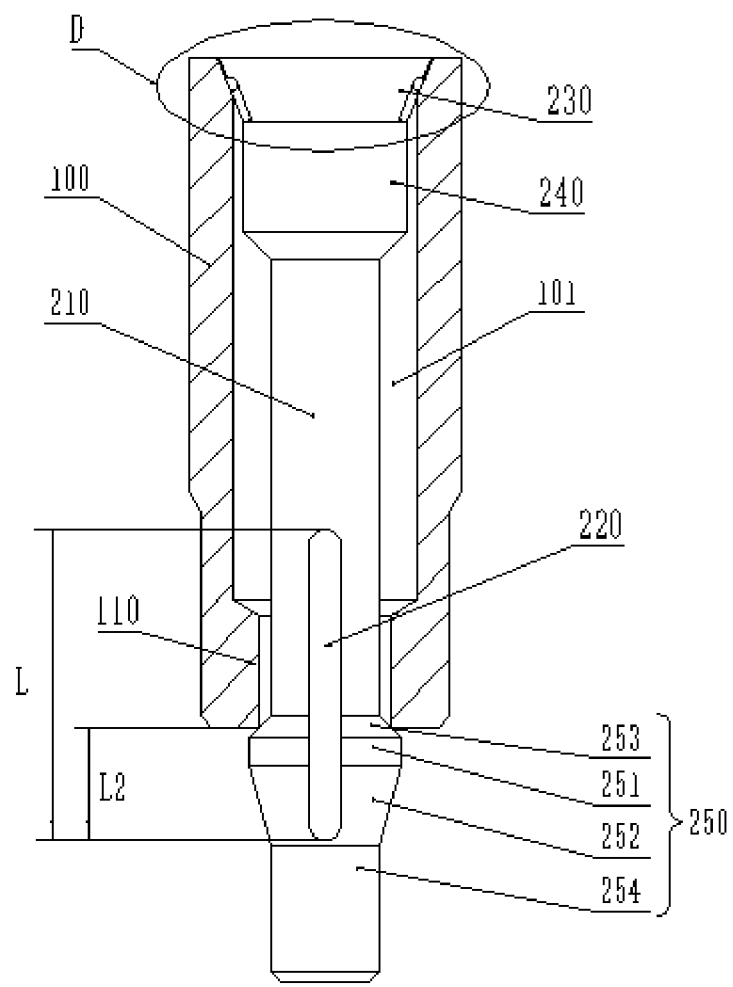
FIG. 14 is a structural schematic view of the venting device provided according to embodiment III of the present invention.
Figure 15:
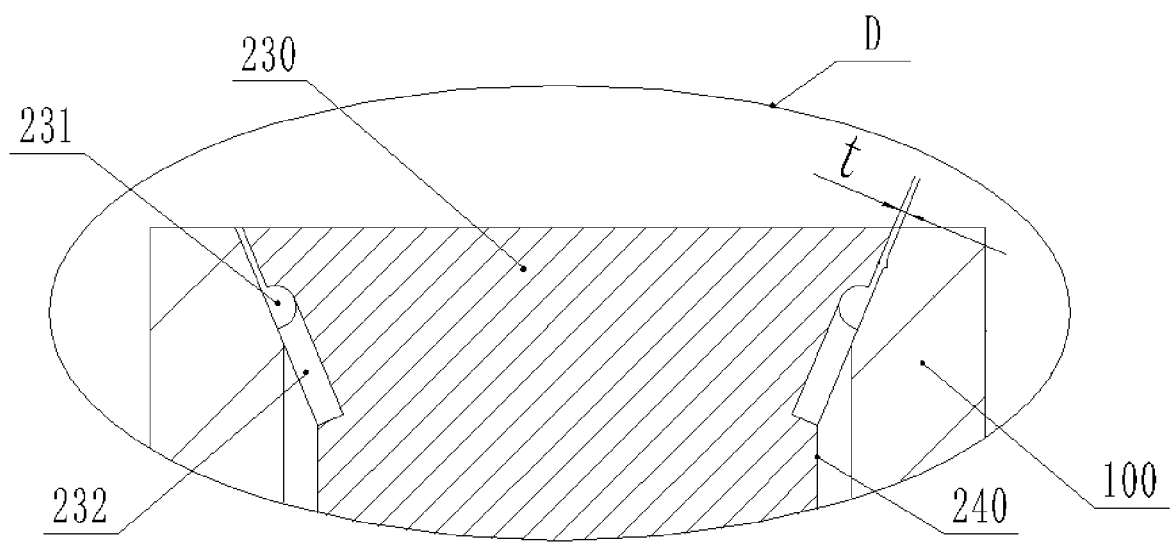
FIG. 15 is an enlarged schematic view of position D in FIG. 14.

As shown in FIGS. 14 and 15, this embodiment differs from embodiment I and embodiment II in that the shaft end piece 250 also functions to apply on the core shaft 200 a force from the shaft head 230 towards the shaft end piece 250, so that the shaft head 230 abuts against the sleeve 100, a gas inlet slit or gas inlet opening is presented between the shaft head 230 and the sleeve 100, the gas inlet slit or gas inlet opening communicates the venting passage 101 and outside of the venting device.

One embodiment is that an outer wall surface of the shaft head 230 is provided with an annular slot 231 extending circumferentially, a side of the annular slot 231 proximal to the shaft end piece 250 is provided with a plurality of gas slots 232, at a side of the annular slot 231 proximal to the shaft end piece 250, the shaft head 230 abuts against the sleeve 100, at a side of the annular slot 231 distal to the shaft end piece 250, the shaft head 230 separates from the sleeve 100 to form a gas inlet slit, the gas inlet slit communicates the annular slot 231 and the outside of the venting device, the gas slot 232 communicates the annular slot 231 and the venting passage 101. The width t of the gas inlet slit is preferably 0.01 mm-0.06 mm, so that the rubber material cannot enter into the gas inlet slit; or, the outer wall surface of the shaft head 230 is provided with several gas slots 232 for venting disposed around the core shaft 200 circumferentially, the gas slot 232 for venting communicates the venting passage 101 and outside of the venting device, the gas slot 232 has an opening with radial size preferably 0.01 mm-0.06 mm; or, ribs can be provided on the outer wall surface of the shaft head 230 or on the sleeve 100, the shaft head 230 connects to the sleeve 100 via the ribs, gas inlet slit is formed between the shaft head 230 and the sleeve 100, the gas inlet slit communicates the venting passage 101 and outside of the venting device.

Figure 18:
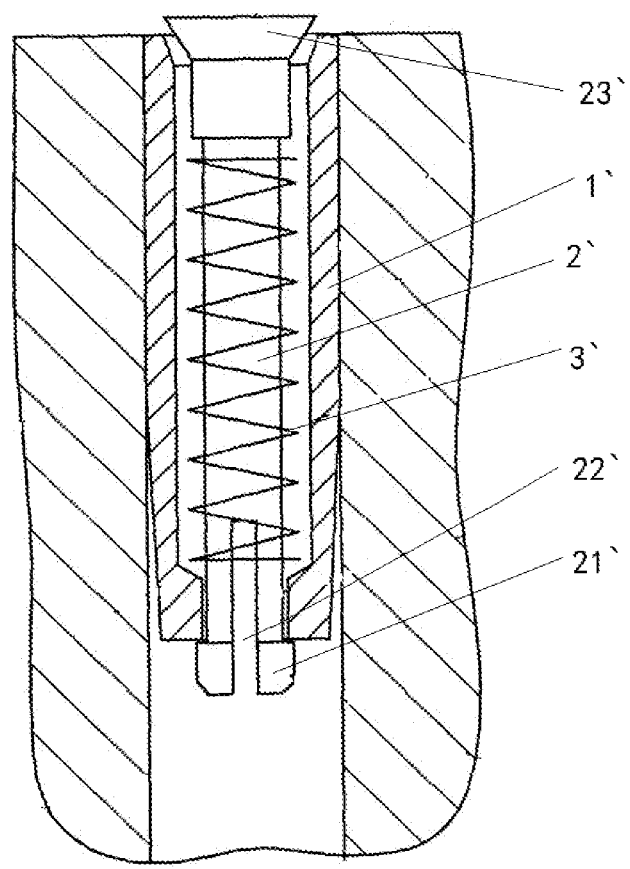
FIG. 18 is a structural schematic view of a venting device in the prior art.

By means of the structure the above preferred embodiment of the present invention, the venting device obtain sound technical effects. First, the venting device provided by the present invention has a core shaft 200 with stable and highly accurate closing stroke H, for the venting device provided by the present invention, the tolerance of the closing stroke H of the core shaft 200 can be maintained at ±0.05 mm before vulcanizing 1500 tires, while in the prior art venting device, the initial tolerance of the closing stroke is generally at ±0.15 mm, and the tolerance of the closing stroke will be up to ±0.25 mm or more after vulcanizing 300-400 tires, which does not meet the requirement of use, resulting in that the rubber material may easily enters into the venting device, thus the tire mold is cleaned frequently. Second, in the venting device provided by the present invention, the core shaft 200 and the sleeve 100 are coaxial well, and in the venting device provided by the present invention, the shaft end piece 250 can stop the core shaft 200 steadily, the shaft end piece 250 can abuts against the sleeve 100 in a circumferential direction, thus the core shaft 200 and the sleeve 100 have good coaxiality. Third, in the venting device provided by the present invention, the core shaft 200 is robust, in the venting device provided by the present invention, the shaft end piece 250 is provided with groove 220 with both ends thereof closed, thus the shaft end piece is more rigid than the prior art, the shaft end piece 250 will not easily deform, and the core shaft 200 is robust, the core shaft 200 will not easily disengaged, the rate of the disengagement of the core shaft is lowered to 0.01% or less, while in the prior art shown in FIG. 18, the rate of the disengagement will be 0.05% or more. Fourth, the venting device provided by the present invention has longer life time, cracks may easily occur at the root of the stop 21' in the prior art venting device, at the first assemble, the rate of broken of the stop 21' is as high as 1-2%, especially when machining a tailing end slot 22' of the shaft element 2', since the machining accuracy cannot control the thickness of both stops 21' to be consistent, when installing and detaching the shaft element 2', the deformation amounts of the two stops 21' are not equal, thus the stops 21' is susceptible to elastic fatigue, and the root of the stops 21' is susceptible to cracks, broken, thus the venting device provided by the present invention, compared to the prior art shown in FIG. 18, lowers the rate of core shaft broken by more than 80%.

Embodiment IV

Figure 16:
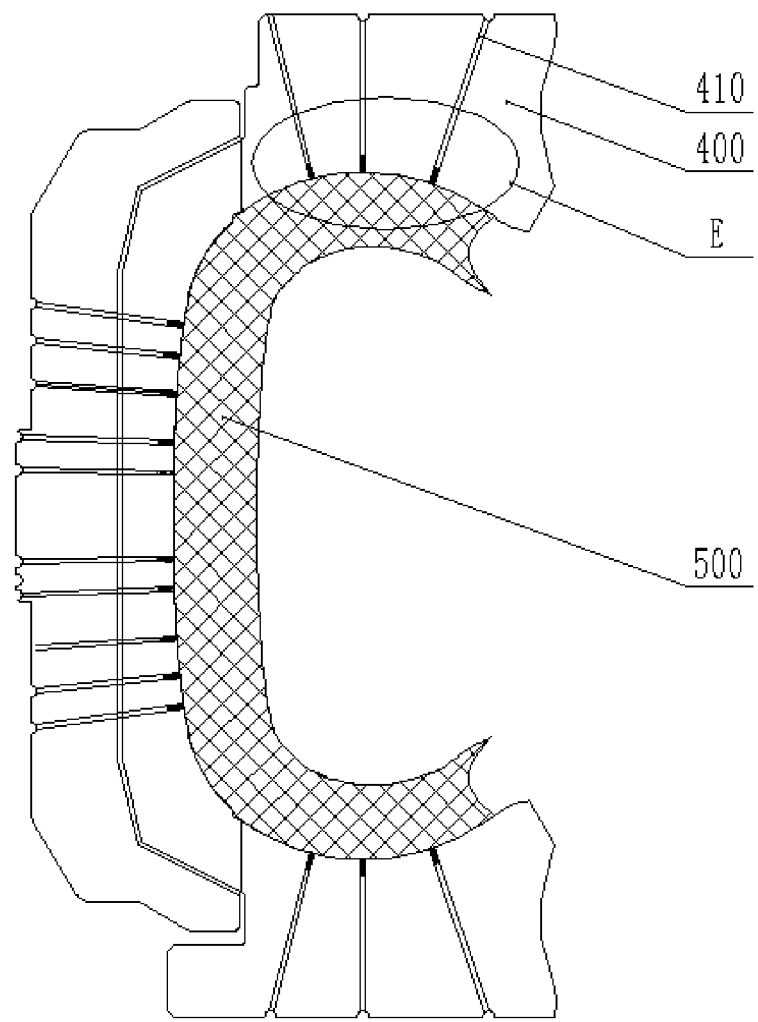
FIG. 16 is a structural schematic view of the tire mold provided according to embodiment IV of the present invention.
Figure 17:
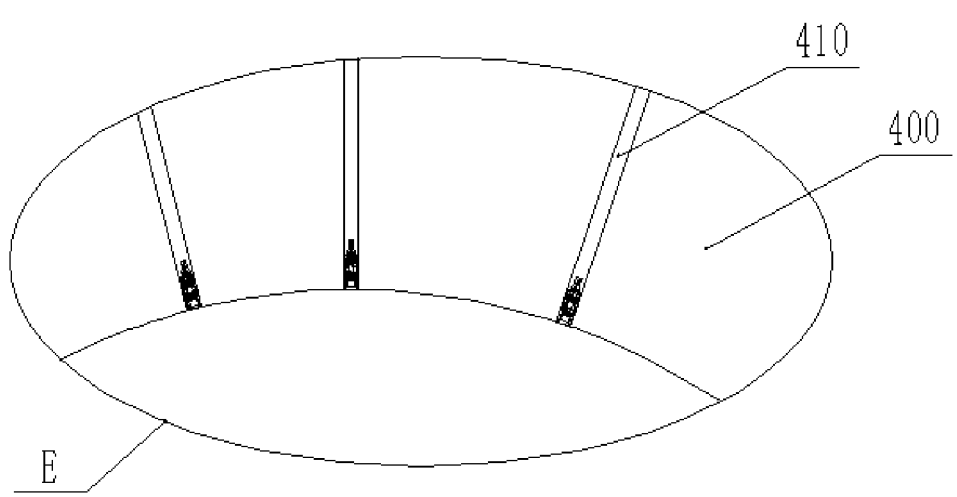
FIG. 17 is an enlarged schematic view of position E in FIG. 16.

As shown in FIGS. 16 and 17, the tire mold provided by the present invention includes the venting device according to the above mentioned embodiments; the tire mold is provided with venting holes 410, in which venting devices are embedded. Wherein, the tire mold includes a cavity molding part 400, the venting holes 410 communicates outside and inner cavity of the cavity molding part 400, the shaft head 230 of the venting device faces the inner cavity, and the shaft head 230 can abut against a tire blank 500, gas between the tire blank 500 and the mold can be expelled outside the tire mold via the venting device.

The tire being vulcanized by the tire mold is free of rubber burr, thus is aesthetic. And, when cleaning the tire mold, it is only needed to detach the core shaft 200 alone, and after cleaning is completed, the core shaft 200 can be installed to the sleeve 100, without the need of completely detaching the venting device, thus avoiding the problems of damaging the venting holes 410 of the tire mold, enlarging the hole diameter, and the sleeve 100 being damaged to result in need of re-disposing the venting device, and the venting device can be reused, with the worn core shaft 200 being able to be replaced. Besides, it is beneficial in reducing damage to the mold, thus extending life time of the mold. Meanwhile, in the venting device of the present invention, the core shaft 200 has a steady, highly accurate closing stroke H, the core shaft 200 will not easily offset from the center; by using the venting device provided by the present invention, frequency of cleaning the tire mold is lowered by about 30%.

At last, it shall be illustrated that the above mentioned embodiments are only used for describing the technical solution of the present invention, but not meant to limit the same; although the present invention is described in detail with reference to the embodiments, one skilled in the art shall understand that the technical solution of recorded in the embodiment can be modified, or part or all features thereof can be equally replaced; and such modifications or replacement will not make the respective solution go beyond the scope of the essence of the present invention.

What is claimed is:

1. A venting device comprising:
   a core shaft;
   a sleeve sleeved over the core shaft, the sleeve having a gas inlet end and a gas outlet end; and
   a venting passage formed between the sleeve and the core shaft, wherein
      the core shaft includes a shaft body, one end of the shaft body is connected to a shaft head, the other end of the shaft body is connected to a shaft end piece provided with a groove extending through the shaft end piece, a diametric size of the shaft head increases from an end thereof connected to the shaft body to an end thereof facing away from the shaft body, and an end of the groove facing away from the shaft head is closed; and
      the shaft end piece is used for axially stopping the core shaft, and the shaft end piece is further used for assembling the sleeve and the core shaft by contracting and springing back.

2. The venting device according to claim 1, wherein
   the shaft end piece includes a first shaft section and a first guide;
   the first shaft section is connected between the shaft body and the first guide, the groove extends through the first shaft section and the first guide; and
   the first guide has a radial size decreased in a direction from an end thereof connected to the first shaft section to an end thereof facing away from the first shaft section.

3. The venting device according to claim 2, wherein an outer wall surface of the first guide is a conical surface, and a conical angle of the first guide is in a range of 20 degrees to 90 degrees.

4. The venting device according to claim 3, wherein when the core shaft is inserted into the sleeve from the gas inlet end, and the outer wall surface of the first guide abuts against the sleeve, an axial distance from the end of the groove facing away from the shaft head to an abutting point is 10% to 60% of an axial length of the groove.

5. The venting device according to claim 2, wherein an end of the groove proximal to the shaft head extends in the shaft body, the shaft end piece is further used for removing the core shaft from the sleeve by means of contracting and springing back, and the groove communicates the venting passage and outside of the venting device.

6. The venting device according to claim 5, wherein the shaft end piece also includes a second guide connected between the shaft body and the first shaft section, wherein a radial size of the second guide increases in a direction from an end thereof connected to the shaft body to an end thereof facing away from the shaft body.

7. The venting device according to claim 6, wherein an outer wall surface of the second guide is a conical surface, and a conical angle of the second guide is in a range of 30 degrees to 110 degrees.

8. The venting device according to claim 7, wherein when the venting device is in an assembled state, the second guide abuts against the sleeve, an axial distance from the end of the groove facing away from the shaft head to an abutting point is 25%-75% of an axial length of the groove.

9. The venting device according to claim 5, wherein the gas outlet end of the sleeve is provided with a guide surface for forming the gas outlet end of the sleeve with an opening having a radial size decreasing from outside to inside.

10. The venting device according to claim 9, wherein the guide surface is a conical surface, and a conical angle of the guide surface is in a range of 30 degrees to 110 degrees.

11. The venting device according to claim 10, wherein when the venting device is in an assembled state, an end of the first shaft section facing towards the shaft head abuts against the guide surface, an axial distance from the end of the groove facing away from the shaft head to an abutting point is 25%~75% of an axial length of the groove.

12. The venting device according to claim 2, wherein a difference between a diameter of the first shaft section in a released state and an inner diameter of the gas outlet end of the sleeve is a, and a value of a width of the groove is in a range of 3a~10a.

13. The venting device according to claim 12, wherein the difference between the diameter of the first shaft section in the released state and the inner diameter of the gas outlet end of the sleeve is in a range of 0.04 mm~0.1 mm.

14. The venting device according to claim 1, wherein a ratio of an axial length of the groove to a width of the groove is in a range of 5~20.

15. The venting device according to claim 2, wherein the end of the first guide facing away from the first shaft section is connected by an extension.

16. The venting device according to claim 1, wherein an outer wall surface of the shaft end piece includes an arc surface.

17. The venting device according to claim 1, wherein
an elastic element is provided between the sleeve and the shaft body;
the core shaft has a first position and a second position in the axial direction;
in the first position, a gas inlet gap is formed between the shaft head and the sleeve, the gas inlet gap communicates the venting passage and outside of the venting device, and the shaft end piece abuts against the sleeve; in the second position, the shaft head abuts against the sleeve; and
the elastic element is used for providing the core shaft with a trend of moving from the second position to the first position.

18. The venting device according to claim 1, wherein
the shaft end piece is further used for exerting a force on the core shaft from the shaft head to the shaft end piece, so that the shaft head abuts against the sleeve; and
a gas inlet slit or gas inlet opening is presented between the shaft head and the sleeve, the gas inlet slit or gas inlet opening communicates the venting passage and outside of the venting device.

19. A tire mold, comprising a venting device according to claim 1, and the tire mold is provided with a venting hole in which the venting device is disposed.

* * * * *